United States Patent [19]

Blanchard

[11] Patent Number: 5,371,936
[45] Date of Patent: Dec. 13, 1994

[54] TRAMPOLINE ASSEMBLY TOOL AND A METHOD OF ASSEMBLING A TRAMPOLINE

[76] Inventor: J. Wayne Blanchard, 60320 La Fouche St., Plaquemine, La. 70764

[21] Appl. No.: 108,430

[22] Filed: Aug. 19, 1993

[51] Int. Cl.⁵ .............................................. B23D 19/04
[52] U.S. Cl. ........................................ 29/436; 29/227
[58] Field of Search ............... 29/225, 227, 229, 239, 29/244, 433, 436, 173

[56] References Cited

U.S. PATENT DOCUMENTS

| | | | |
|---|---|---|---|
| 1,843,866 | 2/1932 | Chapman | 29/227 |
| 1,889,167 | 11/1931 | Anderson | |
| 2,042,287 | 5/1936 | Allievi et al. | 29/227 |
| 2,274,981 | 3/1942 | Grubb | 29/87.1 |
| 2,441,696 | 5/1948 | Feingold | 29/227 |
| 2,673,392 | 3/1954 | McFadden | 29/227 |
| 2,811,772 | 5/1955 | Johnson | 29/227 |
| 4,063,342 | 12/1977 | Mitchell et al. | 29/227 |
| 4,068,363 | 1/1978 | Costa | 29/227 |
| 4,653,185 | 3/1987 | Kajima et al. | 29/225 X |
| 4,863,156 | 9/1989 | Shaw | 272/65 |
| 4,870,737 | 10/1989 | Navarro | 29/227 |
| 4,976,022 | 12/1990 | Thornton et al. | 29/227 |
| 5,165,154 | 11/1992 | Miller | 29/267 |

FOREIGN PATENT DOCUMENTS 401147 7/1909 France ............... 29/227

Primary Examiner—Timothy V. Eley
Assistant Examiner—Khan V. Nguyen
Attorney, Agent, or Firm—Reginald F. Roberts, Jr.

[57] ABSTRACT

A tool for attaching springs to a trampoline mat, and a method for using the tool to assemble a trampoline. The tool has a straight rigid shaft and a curved rigid handle connected and separated by a rigid plate. The handle is curved to fit the closed hand of a user, and the plate prevents accidental contact of the spring with the user's hand regardless of the orientation of the tool. One end of each spring is connected to the frame of the trampoline. The other end of the spring is slipped over the straight shaft of the tool, then attached to one of the "D" rings on the mat. By pushing the tool away from him or her, the user causes the spring to slide down the shaft and hook onto the "D" ring. The process is then repeated for the other springs and "D" rings.

3 Claims, 3 Drawing Sheets

TRAMPOLINE ASSEMBLY TOOL AND A METHOD OF ASSEMBLING A TRAMPOLINE

BACKGROUND OF THE INVENTION

The present invention relates to a mechanical tool. More particularly, the present invention relates to a tool for assembling a trampoline.

Trampoline springs are usually installed and removed manually. The procedure entails considerable difficulty and sometimes damage to the equipment and/or injury to the hands.

U.S. Pat. (U.S.P.) No. 4,976,001 to Thornton et al. discloses a hand-held and hand-manipulated tool adapted to hook or unhook a helical spring such as a trampoline spring, to or from an anchoring structure such as the frame of a trampoline. The tool comprises an elongate level "of the second kind." The end of the lever is adapted to rest on the surface of the spring as a fulcrum. The opposite end of the lever provides the power arm of the lever, and has a handle formed at its free end transversely of the lever, and a work arm depending from between the power arm and the fulcrum adjacent to the fulcrum and formed to receive and hold the unanchored loop, hook, eye end of the spring, whose other end is anchored to a supporting structure such as the grommeted margin of the trampoline jump sheet.

When the tool engages the spring and is used as a lever, the force exerted by the user on the power arm longitudinally and usually also transversely, to move the anchoring loop, eye, or hook, or eye end of the spring, whose other end is anchored to a supporting structure such as the grommeted margin of the trampoline jump sheet.

When the tool engages the spring and is used as a lever, the force exerted by the user on the power arm results in an elastic distortion of the spring longitudinally and usually also transversely, to move the anchoring loop, eye, or hook to a position for hooking or unhooking to an anchoring structure such as the rigid support frame for the flexible jump sheet of a trampoline.

The power arm (20) has a transversely-oriented handle portion (20a) at the free end of an outwardly-curved portion (20b), for grasping by the user. At the opposite end of the tool is formed a forked fulcrum member (21). Between the power arm (20) and the fulcrum member (21), a work arm (22) projects angularly opposite to the outwardly-curved portion (20b). The work arm (22) is located adjacent to the fulcrum member (21) but remote from the handle portion (20a) of the power arm (20), and is formed as a re-entrantly hooked member (22a) for engaging a portion of the circumference of an anchoring loop (11b) in its overhung bed (22b).

The loop (11b) of a spring (11) is engaged by the re-entrantly formed hook (22a) of the work arm (22) so as to be lifted when the power arm (20) is moved upwardly around a center established by the free end of the fulcrum member (21) resting on the spring (11), thereby distorting the spring (11) both longitudinally and transversely. The re-entrantly formed hook (22a) is constructed and arranged so that a portion of the loop (11b) of the spring (11) is engaged in a recess (22b) closed on three sides by portions of the work arm (22) and open only at the top, and so that a portion (22c) of the work arm (22) forms an overhang or overhung bed (22b) above the loop (11b). Thus, in order to disengage the loop (11b) it is necessary to move the hook (22a) downwards, then sideways, with respect to the loop (11b).

If it is desirable to stretch the spring only longitudinally, this is accomplished by grasping the curved portion (20b) of the power arm (20) approximately in line with the longitudinal axis of the spring, thereby eliminating the application of a force tending to twist the spring (11) about the fulcrum point. The tool (10) is then pulled along the longitudinal axis of the spring (11) to stretch the spring longitudinally. Then the loop (11b) is moved transversely by moving the tool (10) as well as the spring (11) transversely, the opposite loop (11a) of the spring (11) pivoting about its anchorage in a grommet (17).

As the tool (10) is pulled to stretch the spring (11) longitudinally, the tool (10) is moved vertically upward to position the free end (23) of the open hook (11b) above a receiving hole (12) in a trampoline frame member (13). The tool (10) is then moved vertically downward to insert the hooked end (23) and the entire hooked loop (11b) of the spring (11) into the receiving hole (12). The pulling force on the tool (10) is then released and the tool removed. To remove the spring (11) from the anchoring frame (13), the reverse procedure is employed. For use of the tool (10) in this manner only, the tool could be constructed with a shortened power arm (20) so that the graspable portion of the arm (20) would be vertically oriented in a plane aligned with the longitudinal axis of the spring. Furthermore, the curved portion (20b) could be a straight continuation of the straight portion (20c) if no accommodation of an anchoring part is required.

U.S. Pat. No. 1,889,167 to Anderson discloses a spring-installation tool comprising an elongated member having one end adapted for insertion into the aperture of a spring abutment. The elongated member is provided on one face thereof with a longitudinal groove extending to the end of the tool. The other face of the member is provided, adjacent the end of the member, with a shoulder for engagement with the spring abutment into the aperture of which the end of the member is inserted.

U.S. Pat. No. 2,042,287 to Allievi et al. discloses a spring tool which comprises a bar (1) having a laterally and rearwardly offset portion at one end, a handle (2), and a claw (6) at the extremity of the offset portion disposed at an approximate right angle to the longitudinal axis of the bar. The claw is wider than the bar, and has a concave face conforming to the general curvature of a pin or post. The bar has a spur (7) on its rear face adjacent to the offset curved portion and disposed between the handle (2) and the claw (6). The spur (7) serves as a stop to limit the movement of a spring hook on the bar. The other end of the bar (1) tapers to a point which constitutes a sharp prong (3) utilized in removing or coupling the hooked end of a spring into a hole or opening.

The claw (6) end of the bar (1) is inserted through a hook (8) at one end of a spring (9), and the claw (6) is positioned against the far side or face of a pin or post (10). The bar (1) is then swung so as to expand the spring (9) and cause the hooked end (8) of the spring (9) to ride down and off the curved or offset portion (4) of the bar (1) and off the claw (6) on to the pin or post (10).

Alternatively, the prong (3) end of the bar (1) is inserted through the hook (8) of the spring (9), and then positioned through a hole or opening (11) as the tool is swung in a direction which causes the hooked end (8) of the spring (9) to ride down the tapered portion (3) of the bar (1) into the hole or opening (11).

U.S. Pat. No. 2,274,981 to Grubb discloses a tool for the insertion and removal of coil springs under heavy tension. The tool comprises a hollow tubular stem (1) having at one end thereof a handle in the form of a hollow tube (3) positioned transversely of the stem, and at its other end a circular flange (5).

To remove a spring from its position, e.g., in the brake assembly of an automotive vehicle, the end of the extension rod is inserted into the opening through which the hooked end of the spring extends, and the flange is worked under the end of the spring until the hooked portion enters a radial notch in the flange. When the hooked end has been grasped by the tool, a partial rotation of the tool in a direction which produces additional tensioning of the spring will suffice to draw the hooked portion of the spring from the opening, thereby freeing it from the brake assembly.

U.S. Pat. No. 2,673,392 to McFadden discloses a tool for removing and replacing springs in and from structures. The tool comprises a thrust member support (1) provided as its lower end with notches (2) for engagement with the rail of a bed spring. The member (1) comprises two portions (1a and 1b) spaced apart and secured by a spacer member (3). A lever member (4), which at one end is shaped to provide a handle (4a), is pivotally mounted on the support member (1), and extends between the side members (1a, 1b). The lever member (4) is mounted on a pivot pin (5). At one end the lever member (4) is provided with an angular portion (4b) which is pivotally connected (at 4c) to an arcuate ratchet member (6).

The arcuate member (6) is provided with a set of teeth (8) adapted for cooperation with the end of the support member (1) by providing the end of the support member (1) with a beveled corner portion (9) or plate (10) between the parallel side members (1a, 1b). The end of the ratchet member (6) is provided with a pair of hooks (13, 13a).

To replace a spring, the thrust member support (1) engages the rail of a bed spring, with the spaced members (1a and 1b) straddling the spring. One of the hooks (13 or 13a) engages the last hook coil of the spring, and the lever (4) is depressed, expanding the spring. Concurrently, the end of the support (1) engages the ratchet teeth (8) of the arcuate member (6), which is lifted upward with respect to the support (1). When the spring has been stretched sufficiently so that the portion of the spring which is in engagement with a hole at the end of a strip (16) may be removed, the end of the support member (1) will be in engagement with a tooth (8) of the ratchet member (6), and the spring will be held in extended condition, thereby enabling the operator to remove the end of the spring from its engagement with the strip (16).

To insert a spring, one end of the spring is attached through a hole in the rail of the bed spring, the thrust member (1) is placed in engagement with the rail so that it straddles the spring, a hook (13, 13a) engages the looped end of the spring, and by manipulation of the handle (4) the spring is stretched sufficiently to enable the looped end of the spring to engage a hole in the strip (16). As the handle (4) is operated, the ratchet member (6) is raised and the end of the support member (1) caused to engage a tooth (8) which will hold the lever (4) in the adjusted position necessary to permit the attachment of the spring to the strip (16).

U.S. Pat. No. 2,811,772 to Johnson discloses a hand tool for removing the hooked end of a spring from a restraining stud and for applying the hooked end of a spring thereto.

The tool comprises a shank having a laterally-disposed portion, with an enlarged body axially fixed to one end of the shank. The enlarged body has a reduced portion at its free end, an axial bore for receiving a spring-retaining stud, and a projecting arcuate lip on the free end of the enlarged boy. The inner surface of the lip is a continuation of the axial bore, and the outer surface of the lip projects outwardly of the adjacent surface of the reduced portion of the enlarged boy, to provide a shoulder and a spiral groove in the lip tapering to a thin leading edge and extending diagonally from one end of the lip through the lip and the shoulder and into the reduced portion of the enlarged body.

A spring-retaining stud is disposed between the ends of a spring-attaching hook disposed on the stud. Upon rotation of the enlarged body, the hook engages the spiral groove and moves the hook rearwardly into engagement with the reduced portion of the enlarged body, to facilitate removal of the hook from the stud.

U.S. Pat. No. 4,068,363 to Costa discloses a hand tool for the manipulation of coil springs. The tool includes a handle and a shank secured thereto at one end thereof. The other, free end of the shank is integrally provided with a coil spring hook-type engaging portion disposed perpendicularly to the shank. The dimensions of the shank and hook portions permit the tool to be inserted and disposed within the central portions of a coil spring and there used to manipulate the spring.

U.S. Pat. No. 4,870,737 to Navarro discloses a brake-spring removal tool. The tool includes laterally-extending spurs which engage the coiled portion of the spring, thereby allowing the user to remove or install the spring.

The tool (10) has an elongated handle (33). The handle (33) has a tapered portion (32) leading into an angled portion (31). The angled portion (31) of the handle (33) terminates in a block (21). Each side of the block (21) has an upper spur (22) and a lower spur (23) projecting perpendicularly from the side of the block (21).

The user inserts one of the spurs (22 or 23) into the coiled portion of a brake spring. When the user twists the tool (10) slightly, the spurs will engage the inside of the coiled portion of the spring and extend the spring, thereby reducing the inside diameter of the spring. The user then lifts the spring upwards and thereby removes the spring from its mounting post.

U.S. Pat. No. 5,165,154 to Miller discloses a hand-operated tool which is used to attach and remove the springs anchored to and extending between a pair of brake shoes. The tool includes two separate elements which cooperatively operate as a unit to manipulate the springs into proper engagement with the brake shoes. The first element is a rigid plate, and the second element is a lever.

The plate can be slidingly positioned between the shoes adjacent the spring after a first, hooked end of the spring has been anchored to an aperture in the top shoe. The plate includes a boss projecting from either side thereof, which serves as a fulcrum for the lever.

The lever includes a handle with a linear shank extending therefrom, terminating in a free, distal end. The distal end has a rounded tip, and includes at least one annular groove adjacent thereto which is used to grasp the second, hooked end of the spring. With the lever positioned against the boss on the plate, the lever can be used to pull the second end of the spring into engagement with an aperture in the bottom of the shoe.

SUMMARY OF THE INVENTION

In general, the present invention in one aspect provides a tool for assembling a trampoline. The tool comprises a rigid, straight, elongated member; a rigid, curved member; and a rigid, thin, flat member. The curved member is constructed and arranged to fit a closed hand and serve as a handle. The flat member, which is disposed between the elongated member and the curved member, is constructed and arranged to prevent contact of the hand with a trampoline spring having one end loop thereof attached to the frame of the trampoline, when the other end loop of the spring is passed over the elongated member, regardless of the orientation of the trampoline assembly tool.

The flat member has first and second opposite faces. The elongated member has first and second ends. The first end of the elongated member is contiguous with the first face of the flat member, and the second end of the elongated member is free. The curved member has first and second ends. The first end of the curved member is contiguous with the second face of the flat member, and the second end of the curved member is free.

In a second aspect the invention provides a method for assembling a trampoline having a frame, a mat, a plurality of rings attached to the mat, and a plurality of springs. The trampoline is assembled by attaching one end loop of each spring to the frame of the trampoline, and attaching the other end loop of the spring to one of the rings attached to the mat of the trampoline.

The method comprises performing the following operations:
  (a) Connecting the first end loop of each spring to the frame of the trampoline.
  (b) Passing the other end loop of the spring over a rigid, straight, elongated member of an assembly tool comprising the elongated member, a rigid curved member constructed and arranged to fit a closed hand of a user and serve as a handle, and a rigid flat member disposed between and fastened to the elongated member and to the curved member in a substantially perpendicular configuration, to prevent contact of the hand with the spring for any orientation of the tool.
  (c) Disposing an end of the elongated member in one of the rings attached to the trampoline mat.
  (d) Moving the tool in a direction which causes thereby causing the spring to slide down the elongated member and hook onto the ring attached to the trampoline mat.

DETAILED DESCRIPTION OF THE INVENTION

Figure 1:
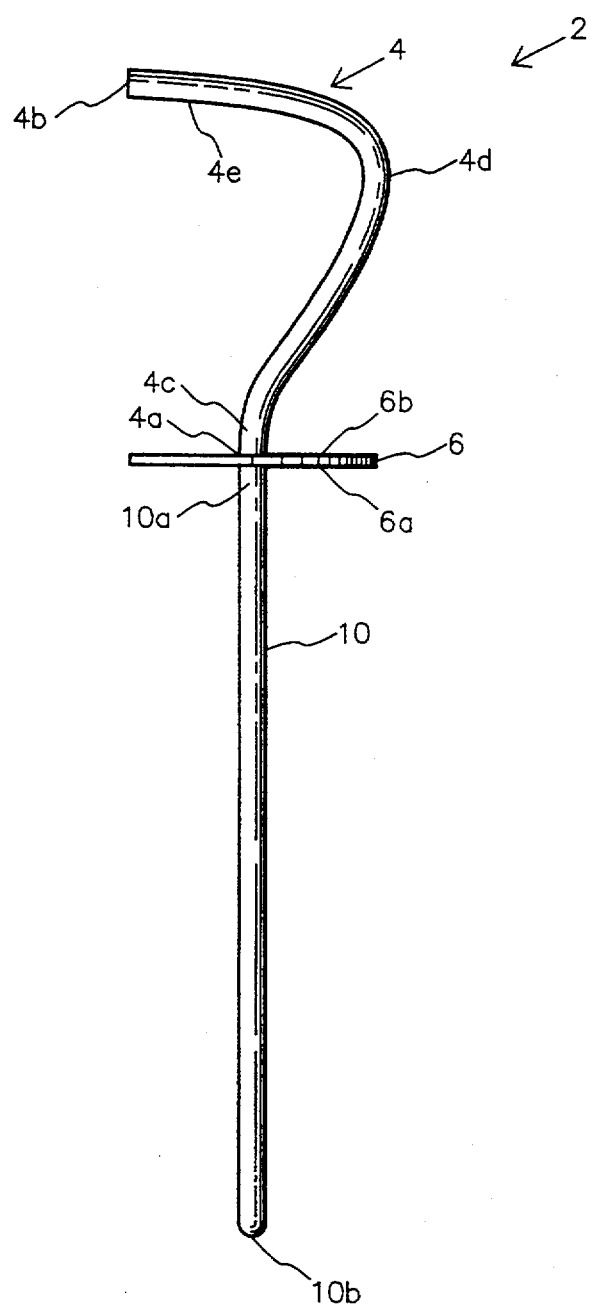
FIG. 1 is a side view of a trampoline assembly tool, made in accordance with the principles of the present invention.

More specifically, reference is made to FIG. 1, in which is shown a trampoline assembly tool, made in accordance with the principles of the present invention, and generally designated by the numeral 2.

The assembly tool 2 comprises a shaft 10, a handle 4, and a plate 6. The handle 4 is constructed and arranged to fit a closed hand. The plate 6, which is disposed between the shaft 10 and the handle 4, is constructed and arranged to prevent contact of the hand with a trampoline spring having one end loop thereof attached to the frame of a trampoline, when the other end loop of the spring is passed over the shaft, regardless of the orientation of the trampoline assembly tool 2.

The shaft 10 has first and second ends 10a and 10b, respectively. The handle 4 has a first end 4a and a second end 4b. The handle 4 has a first substantially straight first segment 4c, a curved second segment 4d, and a second substantially straight segment 4e, all of the segments being coplanar. It has been found that this particular geometry is particularly well suited for a handle of the tool 2. The plate 6 has first and second opposite faces 6a and 6b, respectively. The first end 10a of the shaft 10 is fastened perpendicularly to the first face 6a of the plate 6, and the second end 10b of the shaft 10 is free. The first end 4a of the handle 4 is contiguous with the perpendicular to the center of the second face 6b of the plate 6, and the second end 4b of the handle 4 is free.

Figure 2A:
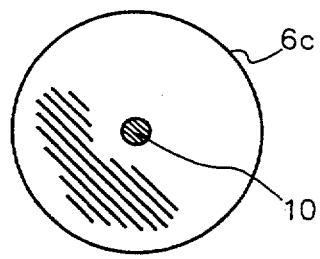
FIG. 2A is a top view of a first embodiment of part of the tool shown in FIG. 1.

Reference is now made to FIG. 2A, in which is shown a first embodiment 6c of the plate 6. The first embodiment 6c comprises a solid plate which completely circumscribes the shaft 10.

Figure 2B:
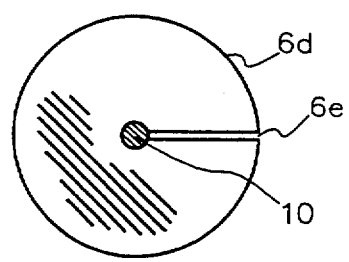
FIG. 2B is a top view of a second embodiment of part of the tool shown in FIG. 1.

Reference is now made to FIG. 2B, in which is shown a second embodiment 6d of the plate 6. The second embodiment 6d comprises a slotted plate having at least one slot 6e therein. Because the plate 6d includes a slot 6e or a plurality of such slots, the plate 6d does not completely circumscribe the shaft 10.

The first and second embodiments 6c and 6d of the plate 6 have been shown in FIGS. 2A and 2B, respectively, as circular. It is to be understood, however, that this particular geometry, while preferred, is not critical. For example, the plate 6 may be square, rectangular, triangular, star-shaped, or elliptical.

It is critical, however, that the plate 6 be constructed and arranged so that all contact between the user's hand and a trampoline spring being manipulated by the tool 2 is prevented. For this reason the diameter or width of the plate 6 must be at least sufficient to prevent an end of the spring from protruding above the plate 6. Furthermore, the slot or slots 6e in the second embodiment 6d of the plate 6, shown in FIG. 2B, must be sufficiently narrow that an end of the spring cannot protrude therethrough.

Here reference is made to U.S. Pat. No, 2,042,287 to Allievei et al., which discloses a spring tool having a bar (1), a handle (2), a claw (6), and a spur (7) disposed on the rear face of the bar (1) between the handle (2) and the claw (6). The purpose and function of the spur (7) are to limit the movement of a spring hook on the bar (1). Because, however, of the nature, construction, and arrangement of the spur (7), a spring hook can slip past the spur (7) if the bar (1) is rotated or turned appreciably during the manipulation of the spring, since the spur (7) is attached to only one side or face of the bar (1). This deficiency is apparent from FIG. 2 of the patent, which shows that the front of the bar (1) is entirely unobstructed and unprotected with respect to the spring hook's slipping past the spur (7) on the front face of the bar (1). Since it is to be expected that, in manipulating the tool, it will often happen that the bar (1) will be turned in such a position that the hook can ride past the spur (7), it will be apparent to those skilled in the art that the spur (7) fails to prevent hand contact with the spring for all orientations of the tool and the bar (1).

Figure 3:
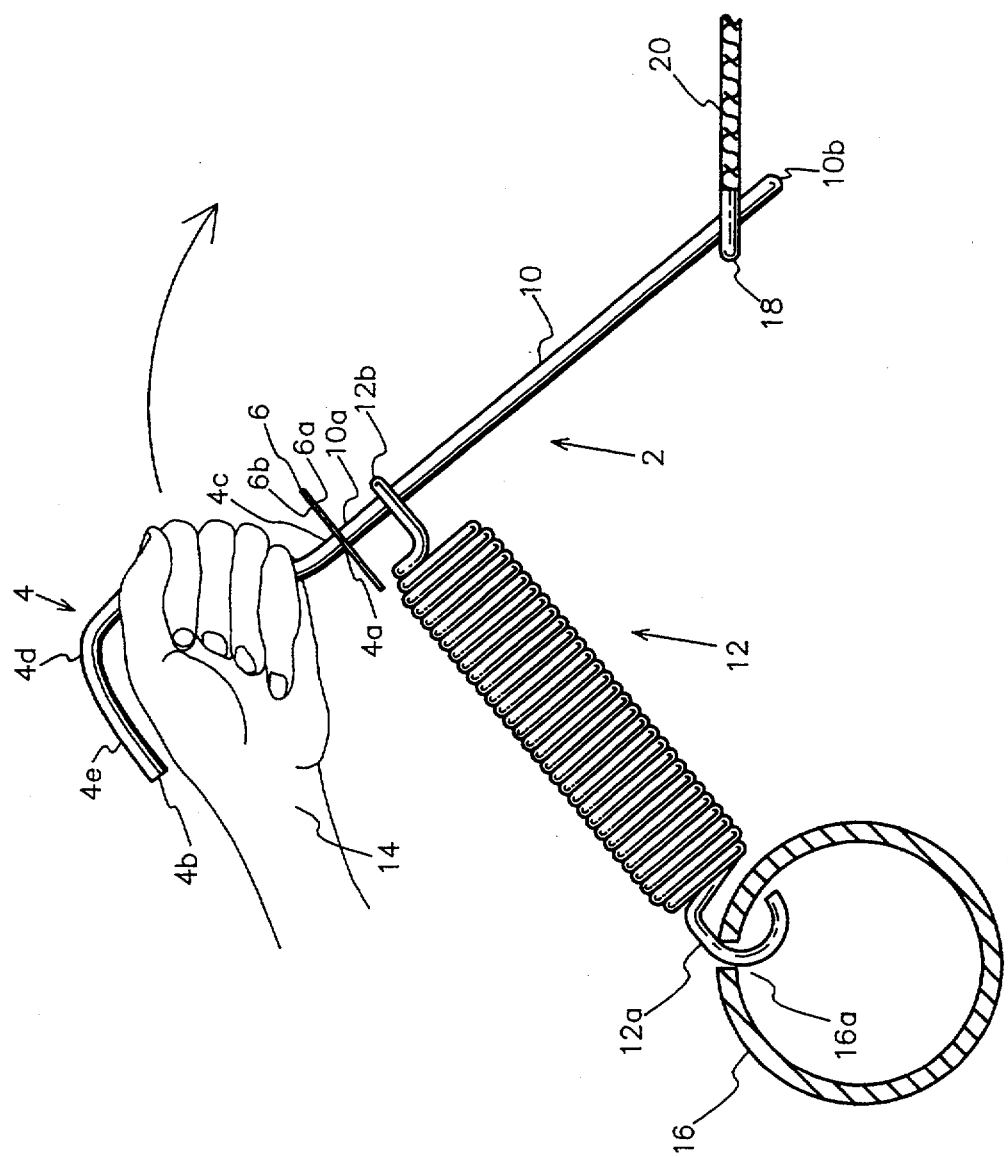
FIG. 3 is a schematic representation, partly in cross-section, of the tool being used to manipulate a trampoline spring, before the spring is stretched.

Reference is now made to FIG. 3, in which is shown a first stage in the operation of installing a spring 12 in a trampoline according to the method of the present invention.

A first end loop 12a of the spring 12 is hooked to the frame 16 of a trampoline having a plurality of openings 16a in the frame 16. The assembly tool 2 is grasped by the handle 4 with a hand 14 around the curved segment 4d of the handle 4. The second end 10b of the elongated member 10 is then disposed in one of the "D" rings 18 attached to a trampoline mat 20. The hand 14 and handle 4 are then used to push the tool 2 away from the person manipulating the tool 2, as indicated by the curved arrow.

Figure 4:
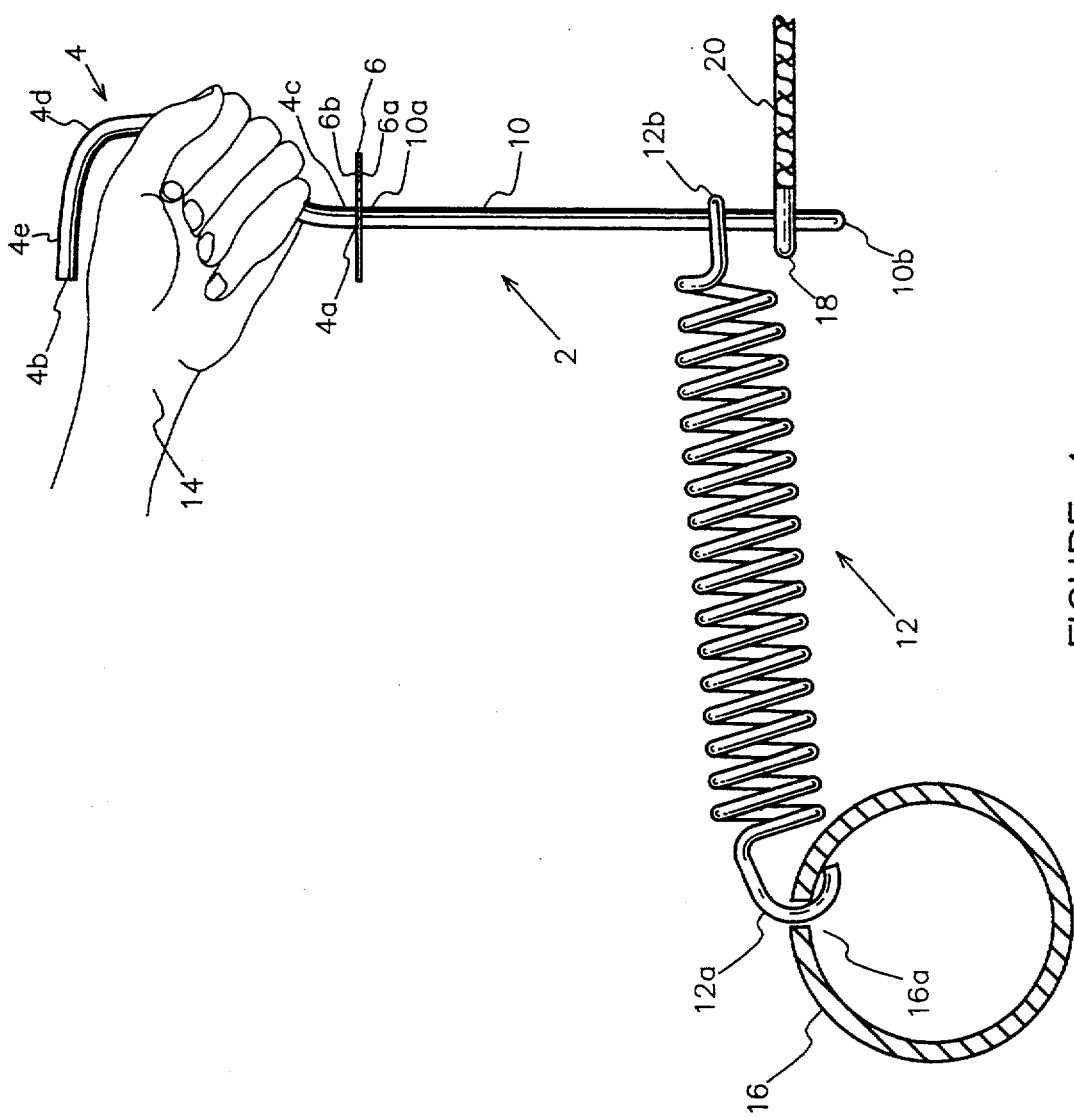
FIG. 4 is a schematic representation, partly in cross-section, of the tool being used to manipulate a trampoline spring, after the spring is stretched.

Reference is now made to FIG. 4, in which is shown a second stage of the operation. Movement of the tool 2 in the direction indicated by the arrow in FIG. 3 has caused the spring 12 to expand and to slide down the elongated member 10 toward the "D" ring 18.

Figure 5:
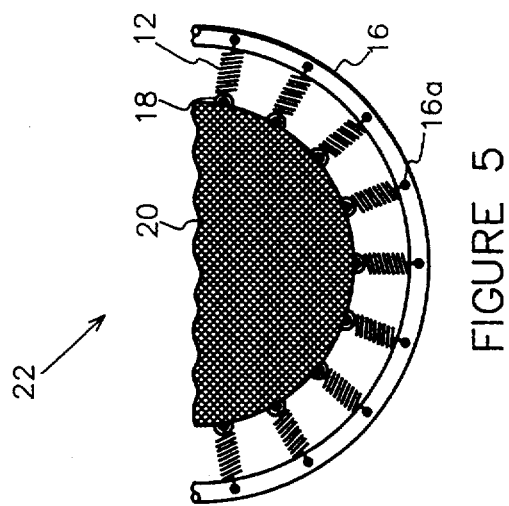
FIG. 5 is a top view of part of a trampoline.

FIG. 5 shows the final result: the second end loop 12b of the spring 12 has engaged one of the "D" rings 18 on the mat 20 of a trampoline mat 22. The procedure is repeated for the other springs 12 and "D" rings 18 until all of the springs 12 have been installed by connecting one end 12a of each spring 12 to one of the openings 16a in the frame 16 of the trampoline 22, and the other end 12b of each spring 12 to one of the "D" rings 18 of the trampoline mat 20.

I claim:

1. A method for assembling a trampoline, comprising the steps of:
    (a) providing a trampoline frame, a trampoline mat, a plurality of rings attached to the mat, and a plurality of springs having first and second loops;
    (b) connecting the first end loop of each of the springs to the frame of the trampoline;
    (c) passing the second loop of each of the springs over a rigid, straight, elongated member of an assembly tool comprising the elongated member, a rigid curved member constructed and arranged to fit a closed hand of a user and serve as a handle, and a rigid, flat member disposed between and perpendicular to the elongated member and to the curved member to prevent contact of the hand with the spring for any orientation of the tool;
    (d) disposing one end of the elongated member in one of the rings attached to the trampoline mat; and
    (e) moving the tool in a direction which causes each of the springs to slide down the elongated member and hook onto the ring attached to the trampoline mat; thereby attaching the first end loop of each of the springs to the frame of the trampoline, attaching the second end loop of each of the springs to one of the rings attached to the mat of the trampoline, and assembling the trampoline.

2. The method of claim 1, wherein the elongated member has first and second ends, the curved member has first and second ends, the flat member has first and second opposite faces, the first end of the elongated member is contiguous with and perpendicular to the center of the first face of the flat member, the second end of the elongated member is free, the first end of the curved member is contiguous with and perpendicular to the center of the second face of the flat member, and the second end of the curved member is free.

3. The method of claim 2, wherein the curved member includes a first substantially straight segment terminating in the first end of the curved member, a second substantially straight segment terminating in the second end of the curved member, and a curved segment disposed between and connecting the first and second straight segments to one another.

* * * * *